March 29, 1966 W. J. WHITHAM 3,242,751
TENSIONING DEVICE FOR A FLEXIBLE TRANSMITTER
Filed May 25, 1964 2 Sheets-Sheet 1

WILLIAM J. WHITHAM
Inventor

By John R. Faulkner
Ernest A. Beutler
Attorneys

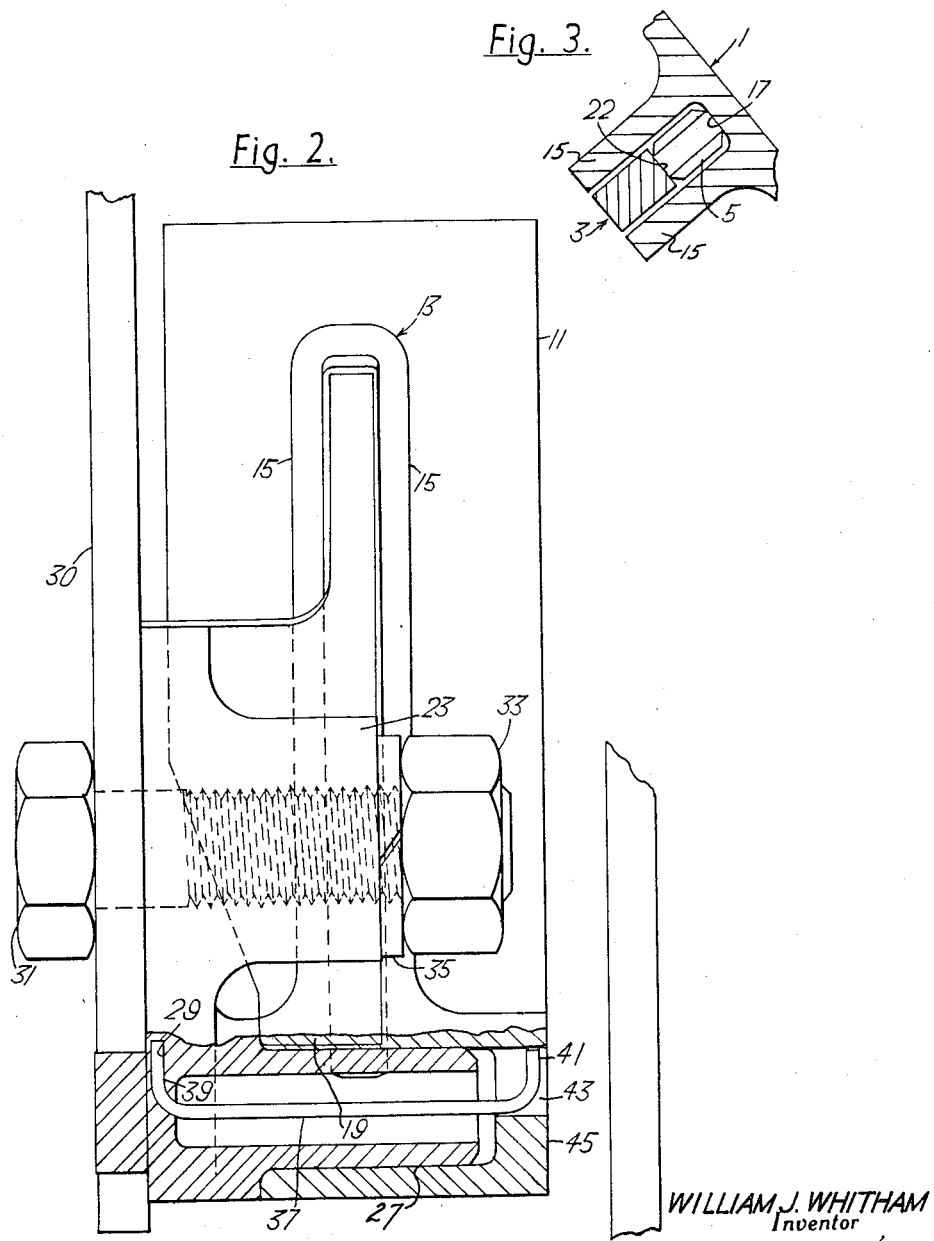

United States Patent Office 3,242,751
Patented Mar. 29, 1966

3,242,751
TENSIONING DEVICE FOR A FLEXIBLE TRANSMITTER
William J. Whitham, Wickford, England, assignor to Ford Motor Company, Dearborn, Mich., a corporation of Delaware
Filed May 25, 1964, Ser. No. 369,834
Claims priority, application Great Britain, May 23, 1963, 20,557/63
6 Claims. (Cl. 74—242.11)

This invention relates to a tensioning device for an endless flexible transmitter such as a chain or belt and more particularly to a tensioning device for the timing chain of an internal combustion engine camshaft drive.

The patent to Brian N. Brindle 3,117,463, entitled Timing Gear Chain Tensioning Device, issued January 14, 1964, illustrates a tensioning device for a camshaft drive timing chain wherein a pivoted lever bears against the chain to maintain its tension. The pivoted lever is locked in an adjusted position by a cam surface that is provided with a plurality of ratchet-like serrations. It has been found that, under some conditions, the relative movement of the locking member may cause wear of the serrations. And, as the serrations become worn, a variation in the tension exerted upon the chain results in attendant chain movement and wear.

It is, therefore, the principle object of this invention to provide a chain tensioning device that maintains a uniform tension through all conditions.

A tensioning device embodying this invention comprises a lever supported for pivotal movement. Engagement means are provided on the end of the lever remote from its pivotal support for engaging a flexible transmitter and exerting a tension thereon. A cam surface is formed upon the lever and a fixed cam surface is opposed to the cam surface of the lever. A wedging member is interposed between the cam surfaces. The wedging member is movable by gravity in a direction that causes pivotal movement of the lever in a first direction to increase the tension on a flexible transmitter. The cam surfaces and the wedging member are constructed and arranged to preclude movement of the lever in a second pivotal direction under the influence of forces exerted upon the engagement means by the flexible transmitter.

Further objects and advantages of this invention will become more apparent as this direction proceeds particularly when considered in conjunction with the accompanying drawings, wherein:

FIG. 2 is a side elevational view of the tensioning mechanism shown in FIG. 1, taken in the direction of the arrow B, with portions shown in section.

FIG. 3 is a cross sectional view taken along the line III—III of FIG. 1.

Figure 1:
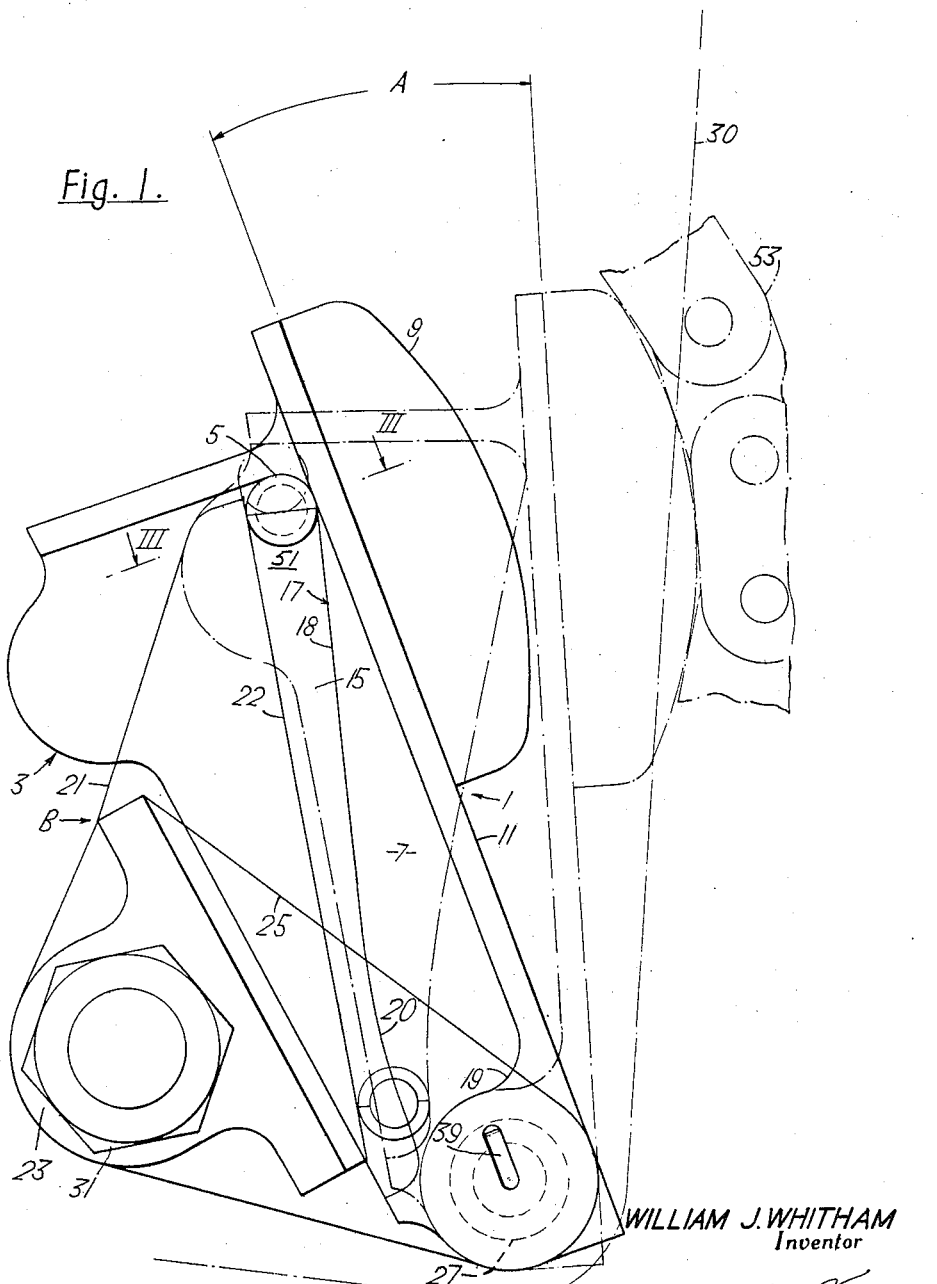
FIG. 1 shows a diagrammatic side elevation of a tensioning mechanism for a timing chain of an internal combustion engine embodying this invention.

Referring now to the drawings, the tensioning mechanism for a timing chain which links the crankshaft and the camshaft of an internal combustion engine comprises a first member, indicated generally at 1; a second member, indicated generally at 3; and a roller 5. The first member 1 comprises a one-piece casting 7 and a hard rubber pad 9 supported on one side of an arm portion 11. An elongated U-shaped channel portion 13 having side flanges 15 extends longitudinally from the other side of the arm portion 11. A bottom cam surface 17 which is inclined relatively to the arm portion 11 extends between the flanges 15. A cylindrical boss 19 is formed at the lower edge of the arm portion 11. The cam surface 17 has a plane upper surface portion 18 and an arcuate lower surface portion 20.

The second member 3 is also a one-piece casting and comprises a generally triangular part 21 which has a plane surface 22 that opposes the cam surface 17. The second member 3 also has a cylindrical boss 23, an arm portion 25 and a hollow fulcrum shaft portion 27 that extends laterally of the arm portion 25. A passage 29 is formed at the inner end of the shaft portion 27.

The cylindrical boss 19 of the first member 1 is journaled on the fulcrum shaft portion 27 of the second member 3. The second member 3 is secured to a front plate 30 of an internal combustion engine by a bolt 31, that extends through the boss 23, a nut 33 and a lock washer 35.

A torsion bar spring 37 extends axially through the hollow fulcrum shaft portion 27 and has a laterally extending portion 39 at one end that is secured in the passage 29. A laterally extending portion 41 formed at the other end of the torsion bar spring 37 is located in a mating slot 43 in an endwall 45 of the boss 19.

The roller 5 is located between and held against lateral movement by the flanges 15 of the first member 1. The roller 5 also is in contact with the plane surface 22 of the triangular part 21 and the relatively inclined cam surface 17 between the U-shaped channel portion 13 of the first member 1. When the roller 5 is in contact with the two surfaces 17 and 22 at the upper ends of the respective members, the two surfaces define a gentle tapered gap 51.

The torsion bar spring 37 resiliently biases the first member 1 in a clockwise direction so that the rubber pad 9 presses against an endless timing chain 53 that transmits motion from a crankshaft driven sprocket to a sprocket on the camshaft (not shown). The tensioning mechanism is mounted on the front plate 30 such that, with the rubber pad 9 in pressing contact with the chain 53, the roller 5 is initially located at the wide end of the gap 51.

If for any reason the chain tends to slacken, the torsion bar spring 37 unwinds to an extent sufficient to rotate the first member 1, in a clockwise sense as viewed in FIG. 1, such that the chain 53 is kept in tension. When the member 1 rotates under the spring bias, the angle of the tapered gap increases and the roller 5 moves downwardly under gravity between the two members.

The roller 5 is effective in all positions of the member 1 relative to the second member 3, within the working arc A of the first member, to prevent any counterclockwise movement of the member 1 back towards the second member 3 which would otherwise occur as a result of chain thrashing movements. When the roller 5 is located in contact with the plane surface 17 and 22 at the upper end of the tapered gap 51, the angle of the gap 51 is relatively small and the force component acting on the roller in the upward direction is also small. Since the surface 17 has a radiused portion 20 at its lower end, the force component acting on the roller in the upward direction is also small at large angular displacements of the first member 1. As a result any tendency for the roller 5 to move upwardly in the gap 51 is substantially eliminated and the first member 1 is effectively locked against rocking movement counterclockwise toward the second member 3 throughout its entire working arc A.

It is to be understood that the invention is not to be limited to the exact construction shown and described, but that various changes and modifications may be made without departing from the spirit and scope of the invention as defined in the appended claims.

What is claimed is:

1. A tensioning device for an endless flexible transmitter comprising a lever supported for pivotal movement, engagement means on one end of said lever for engaging said flexible transmitter and exerting a tension thereon upon movement of said lever in a first pivotal direction, a cam surface formed on said lever, a fixed cam surface opposed to the cam surface on said lever, and a wedging member interposed between said cam surfaces, said wedging member constructed and arranged so as to be movable by gravity in response to movement of said lever in said first pivotal direction.

2. A tensioning device for an endless flexible transmitter comprising a lever supported for pivotal movement, engagement means on the end of said lever remote from its pivotal axis for engaging said flexible transmitter and exerting a tension thereon upon movement of said lever in a first pivotal direction, a cam surface formed on said lever, a fixed cam surface opposed to the cam surface on said lever, and a roller interposed between said cam surfaces and movable by gravity in a first direction in response to pivotal movement of said lever in said first pivotal direction, said cam surfaces being inclined to transmit substantially no force component upon said roller in a direction opposite to said first direction under the influence of forces exerted upon said lever by said flexible transmitter and tending to rotate said lever in a second pivotal direction.

3. A tensioning device as defined by claim 2 wherein biasing means are provided for rotating the lever in the first pivotal direction to increase the tension on the flexible transmitter.

4. A tensioning device for an endless flexible transmitter comprising a lever supported for pivotal movement, engagement means on the end of said lever remote from its pivotal axis for engaging said flexible transmitter and exerting a tension thereon upon movement of said lever in a first pivotal direction, a cam surface formed on said lever, a fixed cam surface opposed to the cam surface on said lever, and a roller interposed between said cam surfaces and movable by gravity in a first direction in response to pivotal movement of said lever in said first pivotal direction, said cam surfaces being inclined to transmit a force from the cam surface on said lever to said roller substantially through the center of said roller under the influence of forces exerted upon said lever by said flexible transmitter for precluding movement of said roller in a direction opposite to said first direction.

5. A tensioning device as defined by claim 5 wherein biasing means are provided for rotating the lever in the first pivotal direction to increase the tension on the flexible transmitter.

6. A tensioning device for an endless flexible transmitter comprising a fixed cam surface, a lever pivoted near one end of said fixed cam surface for pivotal movement toward and away from said fixed cam surface, said lever having engagement means mounted thereon remote from the pivotal axis of the lever for engaging said flexible transmitter and exerting a tension thereon, a cam surface formed on said lever opposing said fixed cam surface, biasing means urging said lever in a first pivotal direction away from said fixed cam surface for increasing the tension on said flexible transmitter, means interposed between said cam surfaces and movable by gravity to prevent return movement of said lever after said lever has moved in said first pivotal direction.

References Cited by the Examiner

UNITED STATES PATENTS

| 2,210,276 | 8/1940 | Bremer | 74—242.11 |
| 2,280,105 | 4/1942 | Sturgess | 74—242.11 |

DAVID J. WILLIAMOWSKY, *Primary Examiner.*

DON A. WAITE, *Examiner.*

J. A. WONG, *Assistant Examiner.*